(12) United States Patent (10) Patent No.: US 7,647,336 B2
Branda et al. (45) Date of Patent: Jan. 12, 2010

(54) CREATING A REAL-TIME CLASS PACKAGE TO CLASS ARCHIVE FILE MAPPING INDEX

(75) Inventors: Steven Joseph Branda, Rochester, MN (US); John Joseph Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 611 days.

(21) Appl. No.: 11/351,240

(22) Filed: Feb. 9, 2006

(65) Prior Publication Data

US 2007/0198974 A1    Aug. 23, 2007

(51) Int. Cl.
G06F 17/30    (2006.01)
(52) U.S. Cl. ...................................... 707/102
(58) Field of Classification Search ............ 707/10, 707/101, 102, 103 X, 103 Y, 103 Z; 711/173; 717/130; 714/807; 719/316
See application file for complete search history.

(56) References Cited

U.S. PATENT DOCUMENTS

2006/0136748 A1* 6/2006 Bade et al. ................. 713/193
2007/0061795 A1* 3/2007 Atsatt ......................... 717/166

* cited by examiner

*Primary Examiner*—Diane Mizrahi
(74) *Attorney, Agent, or Firm*—Martin & Associates LLC; Bret J. Petersen

(57) ABSTRACT

According to the preferred embodiments, an apparatus and method is described for creating a real-time class package to class archive file mapping index that improves the performance of a class loader to load needed classes in an object oriented programming environment. In preferred embodiments, the class loader includes a mapping mechanism that creates and maintains a real-time class package to file archive mapping index. In preferred embodiments, the mapping mechanism optimizes access to the file archive mapping index. In a preferred embodiment, when the mapping mechanism finds a entry in the file archive mapping index for the package, but the class is not found, the class is searched in the class path beginning from the last file archive listed in the index to optimize the search. In other embodiments, the class loader includes a large package list that is used to further optimize access to the archive index.

5 Claims, 7 Drawing Sheets

CREATING A REAL-TIME CLASS PACKAGE TO CLASS ARCHIVE FILE MAPPING INDEX

BACKGROUND OF THE INVENTION

1. Technical Field

This invention generally relates to object oriented programming and more specifically relates to an apparatus and method for creating a real-time class package to class archive file mapping index.

2. Background Art

Computer systems typically include operating system software that controls the basic function of the computer, and one or more software application programs that run under the control of the operating system to perform desired tasks. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object-oriented programming is the "class." A class is a template that defines a type of object. A class outlines or describes the characteristics or makeup of objects that belong to that class. By defining a class, objects can be created that belong to the class without having to rewrite the entire definition for each new object as it is created. This feature of object-oriented programming promotes the reusability of existing object definitions and promotes more efficient use of program code.

Many object oriented programming languages allow packaging multiple classes together in a class archive file. In Java, the class archive file is known as a JAR, where the name comes from the file extension (file.jar). When an application needs a class, the JARs are searched for the needed class. In large applications, the search can impact performance due to the large number of JARs in the search path. One prior art solution has been to combine JARs into one or a few large JARs to decrease the search path, but this solution is not optimal for code reuse and cannot be used where the class path search order must be maintained to ensure the same class file is found given a specific class name.

Another prior art solution created a data structure that maps Java class packages to JARs, so all the JARs in the class path do not need to be searched for each needed class. The prior art systems that used this approach required pre-processing to create a Java package to JAR mapping index. This solution using preprocessing is not practical in complex and changing environments. Without a mechanism for creating a Java package to JAR mapping that can be done without pre-processing or done in real-time, the computer industry will continue to suffer from performance penalties caused by excessive resources used for class path searches.

BRIEF SUMMARY OF THE INVENTION

According to the preferred embodiments, an apparatus and method is described for creating a real-time class package to class archive file mapping index that improves the performance of a class loader to load needed classes in an object oriented programming environment. In preferred embodiments, the class loader includes a mapping mechanism that creates and updates a class package to file archive mapping index in response to requests for a class from an application program. In preferred embodiments, the mapping mechanism optimizes access to the file archive index. In a preferred embodiment, when the mapping mechanism finds an entry in the file archive mapping index for the package, but the class is not found, the class path is searched beginning after the last file archive listed in the index to optimize the search. In other embodiments, the class loader includes a large package list that is used to further optimize access to the archive index.

While the preferred embodiments described herein are directed to the Java programming environment and the JAR archive file, the claimed embodiments herein expressly include other objected oriented programming environments with their associated archive files.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

DETAILED DESCRIPTION OF THE INVENTION

Figure 1:
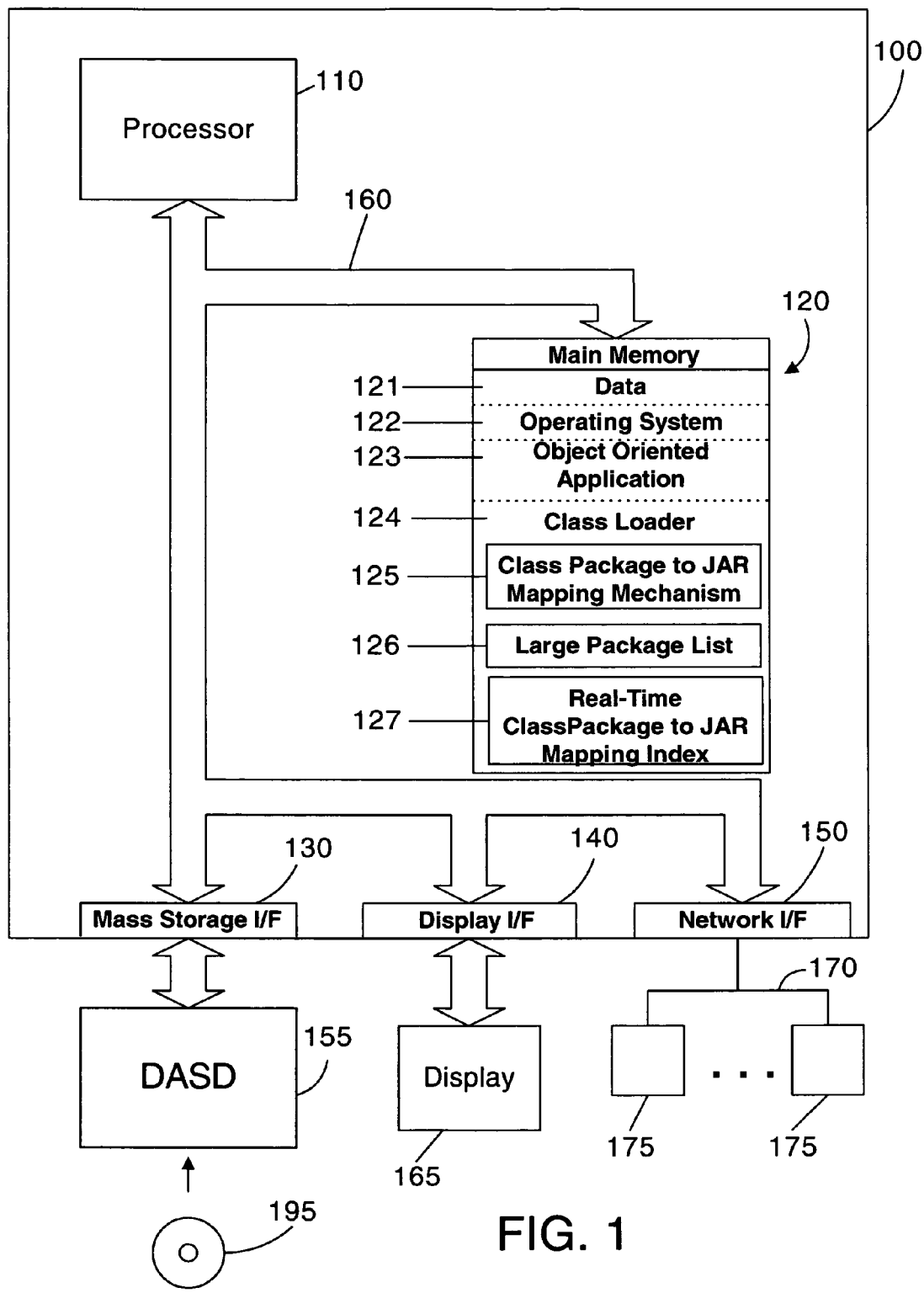
FIG. 1 is a block diagram of an apparatus in accordance with a preferred embodiment of the present invention.

The present invention relates to class archive files for object oriented programming languages, such as Java. For those who are not familiar with object oriented programming concepts or the Java programming language, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

Java allows for storing multiple classes in an archive file. A Java archive file is commonly known as a JAR file, due to the jar file extension used for these files. The present invention, while having particular applicability to creating one or more JAR files from one or more existing JAR files, is equally applicable to any archive file for any object oriented programming language that can hold multiple classes. Note that the terms "class archive file" and "archive file" are used interchangeably herein to denote an archive file that contains object oriented classes.

Another object programming concept is the class package. A package is a collection of related classes that are related for access protection. The package concept is for namespace management and does not dictate actual storage location, but packages often mirror the file system where the classes are stored. The embodiments herein capitalize on the common relationship of the class package naming convention and the storage location. A package can contain several classes that can be stored in one or more JARs.

Figure 2:
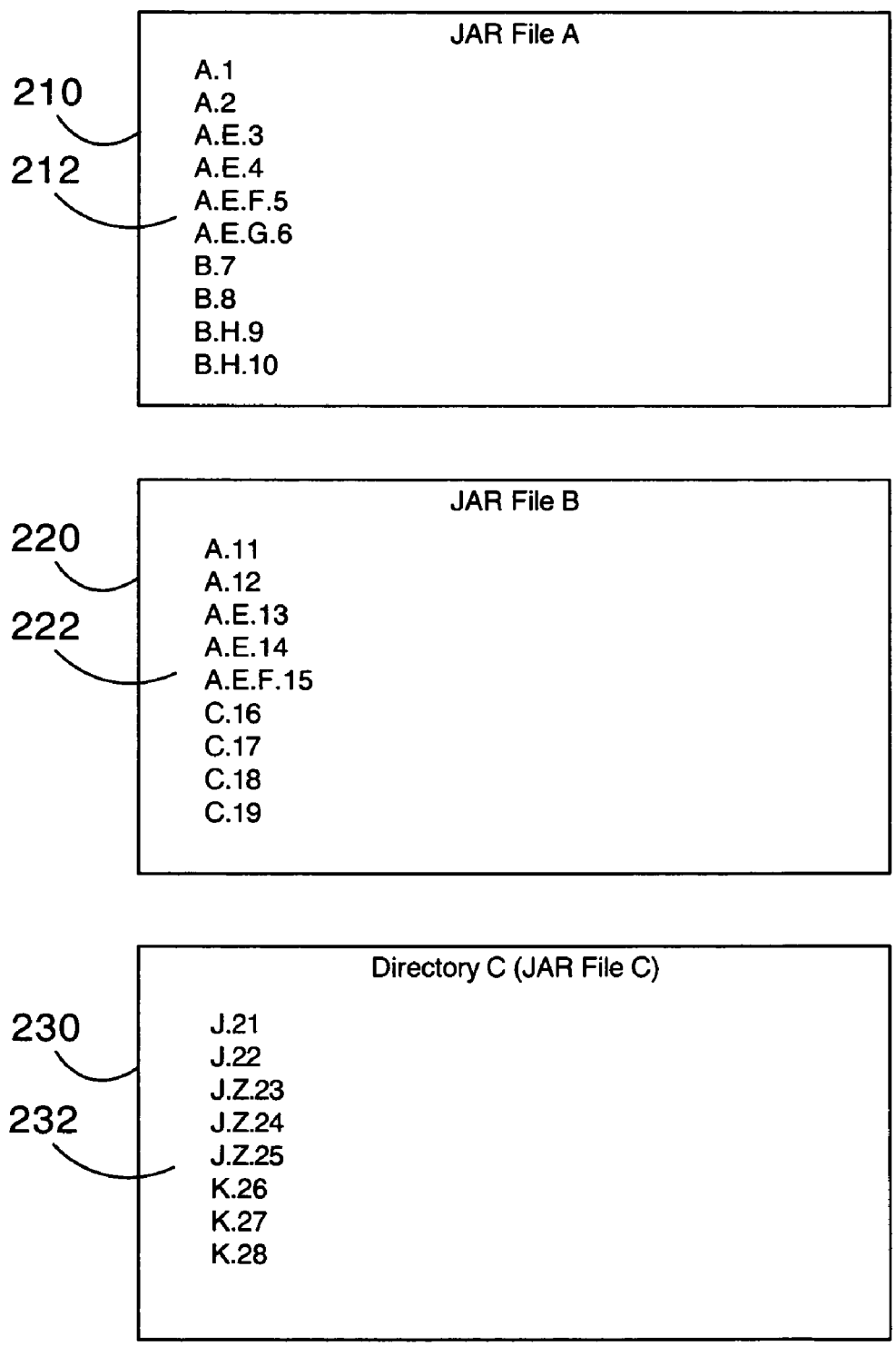
FIG. 2 is a block diagram that represents a collection of JAR files.

FIG. 2 represents a collection of JAR files, JAR file A 210, JAR file B 220 and JAR file C 230. Each JAR file contains a list of several classes 212, 222, and 232. In a real JAR there may be many more classes, but a just a few are shown here for simplicity. The classes are listed with a fully qualified class name. In this example, the classes are given a simplified name for ease of illustration. In many cases the package structure mirrors the file structures, so a Package A corresponds to a directory A that has a Package A.E that corresponds to a subdirectory A.E and so forth. A JAR file is sometimes a directory as indicated by JAR file C 230 shown in FIG. 2 as a directory.

Figure 3:
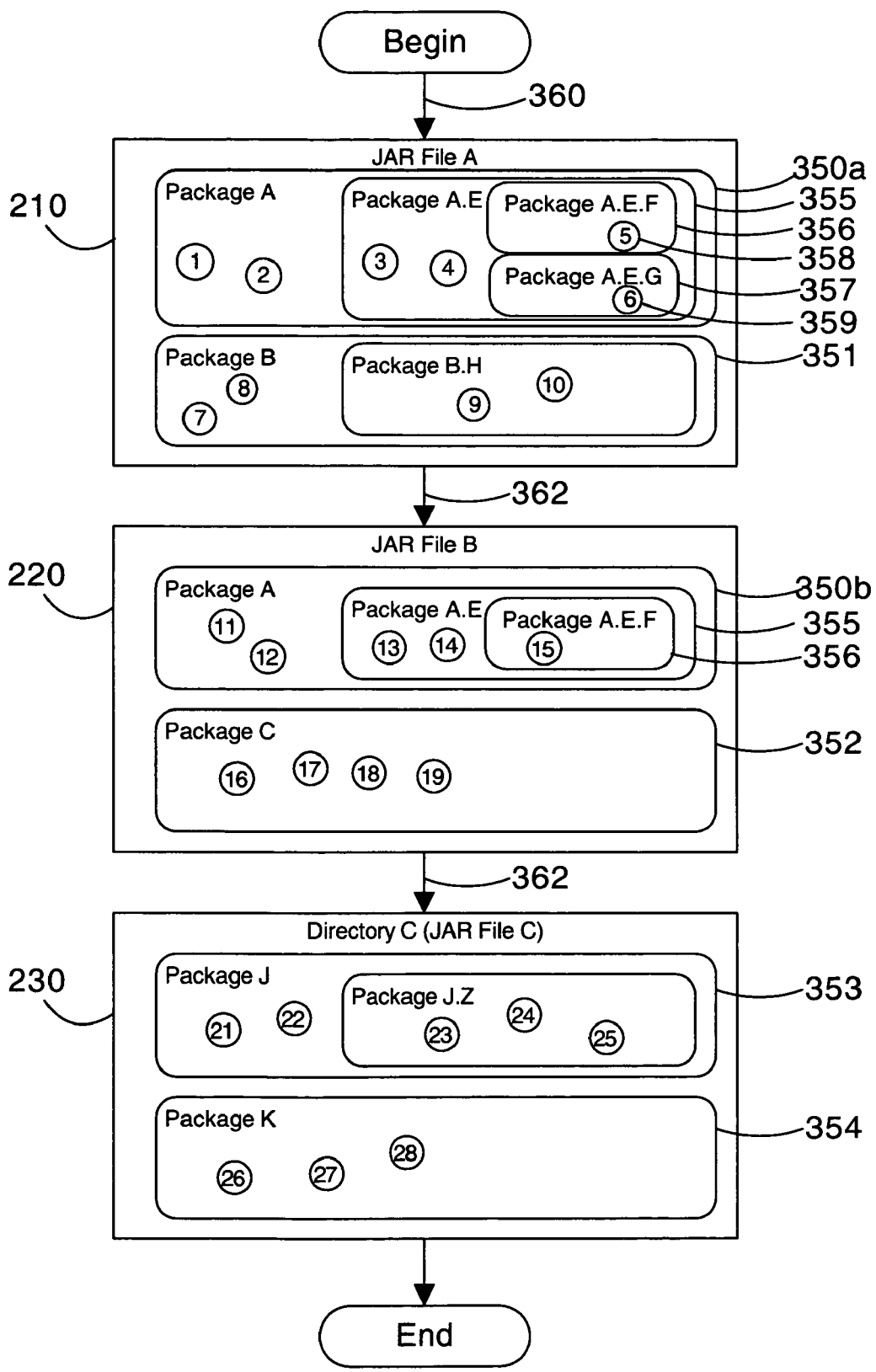
FIG. 3 is a block diagram that represents the collection of JAR files shown in FIG. 2 that shows their class relationship and the class path.

FIG. 3 represents the collection of JAR files shown in FIG. 2. In FIG. 3, the classes are shown in a graphical way to represent the class namespace hierarchy and the class path. The classes within the JAR files are shown in packages as represented by the package blocks 350, 350, 351, 352, 353, and 354 shown in FIG. 2. A portion of package A 350a is in JAR file A 210 and another portion of package A 350b is in JAR file B 220. The combined portions 350a, 350b are referred to herein as package A 350. Further, Package A 350 has a Package A.E 355 that contains a Package A.E.F 356 and a package A.E.G 357. Package A.E.F has a class 5 358 and package A.E.G has a class 6 359. Jar file B 220 also has a package A 350 that has a package A.E 355 that has a package A.E.F 356 which has class 15 360.

FIG. 3 further illustrates the concept of class path in the Java environment. The class path is an environment variable read by the JVM that contains a list of JARs and/or directories to search for a needed class. The class path in the example in FIG. 2 is represented by the pointers 360 from the begin block and the pointers 362 between the JAR files. When an object is needed, the class path is searched for the needed class. In some prior art systems, the class path is searched for the needed class by sequentially searching the JAR files in the class path. In the illustrated example, a search for a class would begin with a search of JAR file A 210 followed by a search of JAR file B 220 and so forth. As described above, this prior art method requires significant system resources and unnecessarily reduces system performance.

Figure 4:
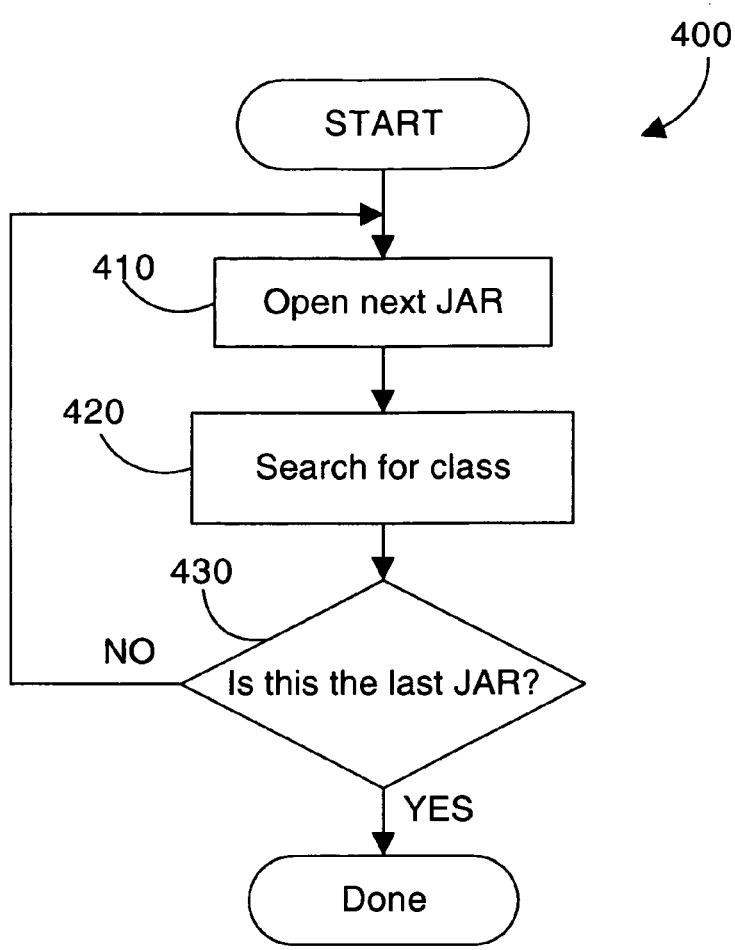
FIG. 4 is a flow diagram of a method for searching for classes in a class path having archive files in accordance with the prior art.

FIG. 4 illustrates a method 400 that illustrates the steps for a prior art class path search as described above. The next JAR in the class path is opened 410, and the JAR is searched for the requested class 420. If the JAR is not the last JAR in the class path (step 430=no) then step 410 is repeated with the next JAR. If the JAR is the last JAR in the class path (step 430=yes) then the method 400 is complete.

Figure 5:
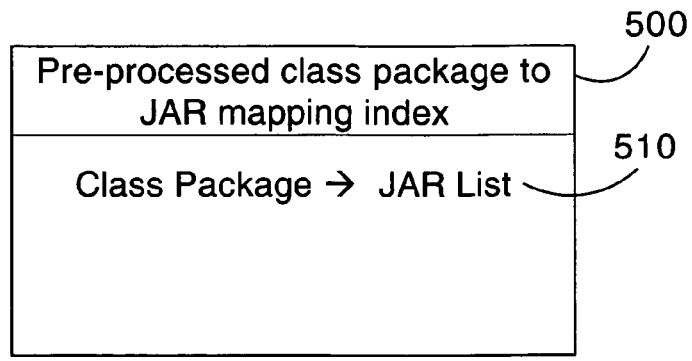
FIG. 5 is a block diagram showing a package to JAR index according to the prior art.

FIG. 5 illustrates another prior art attempt to reduce system resources needed to search for classes in the archive files. In this approach, the class loader or some other software runs a pre-processor that produces a pre-processed class package to JAR mapping index 500. The class package to JAR index has a listing of class packages and the associated JAR list 510 that has JAR names or a pointer to the JAR(s) that contains the package. As described above this approach is not practical in complex and changing environments. The embodiments described herein introduce a mechanism for creating a Java package to JAR mapping that can be done without pre-processing to provide a real-time class package to file archive mapping index.

2. Detailed Description

According to a preferred embodiment of the present invention, a class loader includes a class package to JAR mapping mechanism that creates a real-time class package to JAR mapping index. The real-time class package to JAR mapping index can reduce the time needed to search a class path to load a class and thereby reduce the amount of system resources needed for loading classes, which enhances system performance.

Referring to FIG. 1, a computer system 100 is one suitable implementation of an apparatus in accordance with the preferred embodiments of the invention. Computer system 100 is an IBM eServer iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD RW drive, which may store data to and read data from a CD RW 195.

Main memory 120 in accordance with the preferred embodiments contains data 121, an operating system 122, an object oriented application program 123, and a class loader 124. Data 121 represents any data that serves as input to or output from any program in computer system 100. Operating system 122 is a multitasking operating system known in the industry as i5/OS; however, those skilled in the art will appreciate that the spirit and scope of the present invention is not limited to any one operating system. Object oriented application 123 is any application program that makes calls for loading classes. Class loader 124 loads classes for the objected oriented application 123. The class loader may be part of the operating system 122. The class loader further includes a class package to JAR mapping mechanism (mapping mechanism) 125 that creates and maintains a large package list 126 and a real-time class package to JAR mapping index (mapping index) 127 as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, object oriented application 123, and the class loader 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable signal bearing media used to actually carry out the distribution. Examples of suitable computer media include recordable type media such as floppy disks and CD RW (e.g., 195 of FIG. 1). Note that the preferred computer media is tangible.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

Again referring to FIG. 1, the class package to JAR mapping mechanism (mapping mechanism) 125 will be described in further detail. The mapping mechanism 125 in the preferred embodiments is part of the class loader 124 as introduced above. The class loader operates in the same manner as the JVM class loader known in the prior art with the exception of the additional features as described herein. The class loader 124 functions to provide classes needed by an object oriented application 123 from the JARs in the class path. The JARs can be stored in the memory data 121, on a direct access storage device 155 connected to the system 100 or connected to another computer system 175 over the network 170.

In preferred embodiments, the mapping mechanism 125 uses the large package list 126 while processing requests for classes to create and maintain the real-time class package to JAR mapping index (mapping index) 127. The large package list 126 identifies class packages that are known to span a large number of JARs. In the preferred embodiments, the large package list 126 is maintained by the mapping mechanism 125. The mapping mechanism 125 maintains and refines the large package list by inspection of the mapping index 127 to determine what packages should be put on the large package list. In the preferred embodiments, the mapping mechanism 125 does this maintenance during idle times or when the JVM is shutting down. The maintenance of the large package list allows the mapping index 127 to be optimized depending on the application being run on the JVM.

In preferred embodiments, the large package list 126 is used by the mapping mechanism 125 to optimize access to the archive index. The large package list allows the mapping mechanism to balance the level of the fully qualified path name that is used to access and store entries in the mapping index 127. This balance is the typical dilemma of an index. If an entry were created in the mapping index for every package it would create an extremely large data structure that would be a burden on system resources. In contrast, if entries in the mapping index were created only for large packages, then there is less benefit over just searching sequentially.

In the preferred embodiments, the mapping mechanism 125 uses the large package list to optimally determine what package name to look up in the mapping index. The class loader is first given a fully qualified class name and requested to load the class. A fully qualified class name is the class name that includes the full hierarchy of the namespace of the class. The mapping mechanism 125 compares the fully qualified class name of the needed class to the package names in the large package list 126 to see if the needed class is in one of the large packages, and whether the needed class is contained directly in one of the large packages. The mapping mechanism 125 can determine whether the class is contained in one of the large packages by examining the class name and the package names since we are using the assumption that the class namespace mirrors the class package hierarchy.

If the needed class is in one of the large packages and the class is contained directly in the large package, then the large package is used to look up the class in the mapping index 127. If the needed class is in one of the large packages and the class is not contained directly in the large package, then the class package up one level from the package found to contain the class is used to look up the class in the mapping index 127. Further, if the needed class is not in one of the large packages, the given entire class package name is used to look up the class in the mapping index 127. Searching in the mapping index the class package up one level from the package found to contain the class optimizes the access to the mapping index. Searching the mapping index up one level optimizes the index by creating a record in the index for all classes that are at the same level as the class currently being accessed, even before the other classes at the same levels are requested. In this way, a single search in the index and the record created from that search provides an index key for many future class searches.

For an example of the previous discussion, we refer again to the JARs listed in FIG. 3. We assume the class loader is attempting to load a class 358 in package A.E.F 356 and we assume package A 350 is a package listed in the large package list. Because class 5 358 is located in a sub-package within package A, class 5 is not contained directly in the large package (package A). As a result, the mapping mechanism 125 will use the package one level deeper (A.E.) from the package found to contain the class to look up the package in the mapping index. Using the package one level deeper from the package found to contain the class will optimize future accesses to the mapping index, because the access to the mapping index for A.E will create a record in the index for all packages in A.E 256 and sub-packages within A.E. For example, when a future access to a class in the package A.E.G is requested, the mapping index will already have an entry for this package even though it was not requested previously. The creating of entries in the mapping index is described further below.

Figure 6:
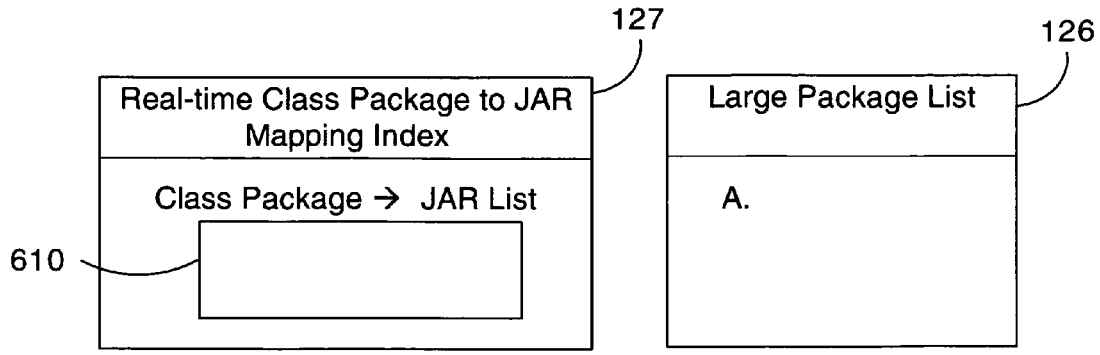
FIG. 6 is a block diagram showing a package to JAR index according to the preferred embodiments.

FIG. 6 shows an example real-time class package to JAR mapping index (mapping index) 127 and a large package list 126 according to preferred embodiments. The mapping mechanism creates the real-time mapping index by creating records or links in the mapping index in response to an application program requesting a class from the class loader The mapping index may be similar in structure to the prior art mapping index shown in FIG. 5. The records or links in the mapping index can be in any index structure such that when the mapping index is given a class package it returns a JAR list 610. The mapping index may be a hash table type index or a tree structured index, though the internal structure of the index is not critical to the present invention and other index structures could be used. In contrast to the prior art, the mapping index 127 is maintained and updated by the mapping mechanism 125 as requests are processed by the class loader 124 (FIG. 1).

Again referring to FIG. 6, the mapping index 127 and the large package list 126 are shown an initial state according to preferred embodiments. The mapping index 127 is empty 610, and the large package list 126 contains the predetermined entry A 620. As the mapping mechanism is invoked the mapping index 127 will be updated as described herein and illustrated further with regards to FIGS. 7 and 8. Also, the large packages list is updated at times as described above. In preferred embodiments, the initial content of the mapping index 127 and the large package list 126 could be initialized with predetermined data. In preferred embodiments, the predetermined data is data that was created by previous executions of the system and the mapping index 127 and the large package list 126 are then saved in a non-volatile memory such as DASD 155, or serialized out to a file on disk and re-loaded at JVM startup.

In the preferred embodiments, the real-time class package to JAR mapping index (mapping index) 127 shown in FIG. 6 is created by the mapping mechanism 125. The mapping index 125 contains a JAR list for corresponding packages. The JAR list for the packages are those that have been stored previously by the mapping mechanism 125. The mapping mechanism 125 has two basic functions when it receives a package for a requested class to look up in the mapping index 127. First, if there is already an entry in the index for the package, the mapping mechanism 125 of the class loader 124 searches the JARs in the JAR list for the requested class. If the class is found, then the mapping mechanism 125 returns the class. If the class is not found, then mapping mechanism 125 searches for the class in the class path beginning after the last JAR in the list. According to the preferred embodiments, starting the search with the last class in the JAR list optimizes the search by skipping the first part of the class path that is known not to contain the class since it was just searched. In contrast, prior art pre-processed indexes searched from the beginning of the class path when a class was not found in the index.

The second basic function of the mapping mechanism 125 when it receives a package for a requested class to look up in the mapping index 127 is to search the class path and create a record for the index. When there is no existing entry in the index for the package, the mapping mechanism 125 searches the class path from the beginning by looking in each JAR in the class path. If a JAR is found the contains the package, the mapping mechanism 125 records the JAR name and the corresponding package in the data structure of the mapping index. If the JAR holds the class, then the class is returned to the class loader to pass to the application requesting the class. If the JAR does not contain the class the mapping mechanism 125 continues to search the class path. If the entire class path is searched and the class is not found, then the mapping mechanism 125 returns an exception or error to the JVM indicating the class was not found.

Figure 7:
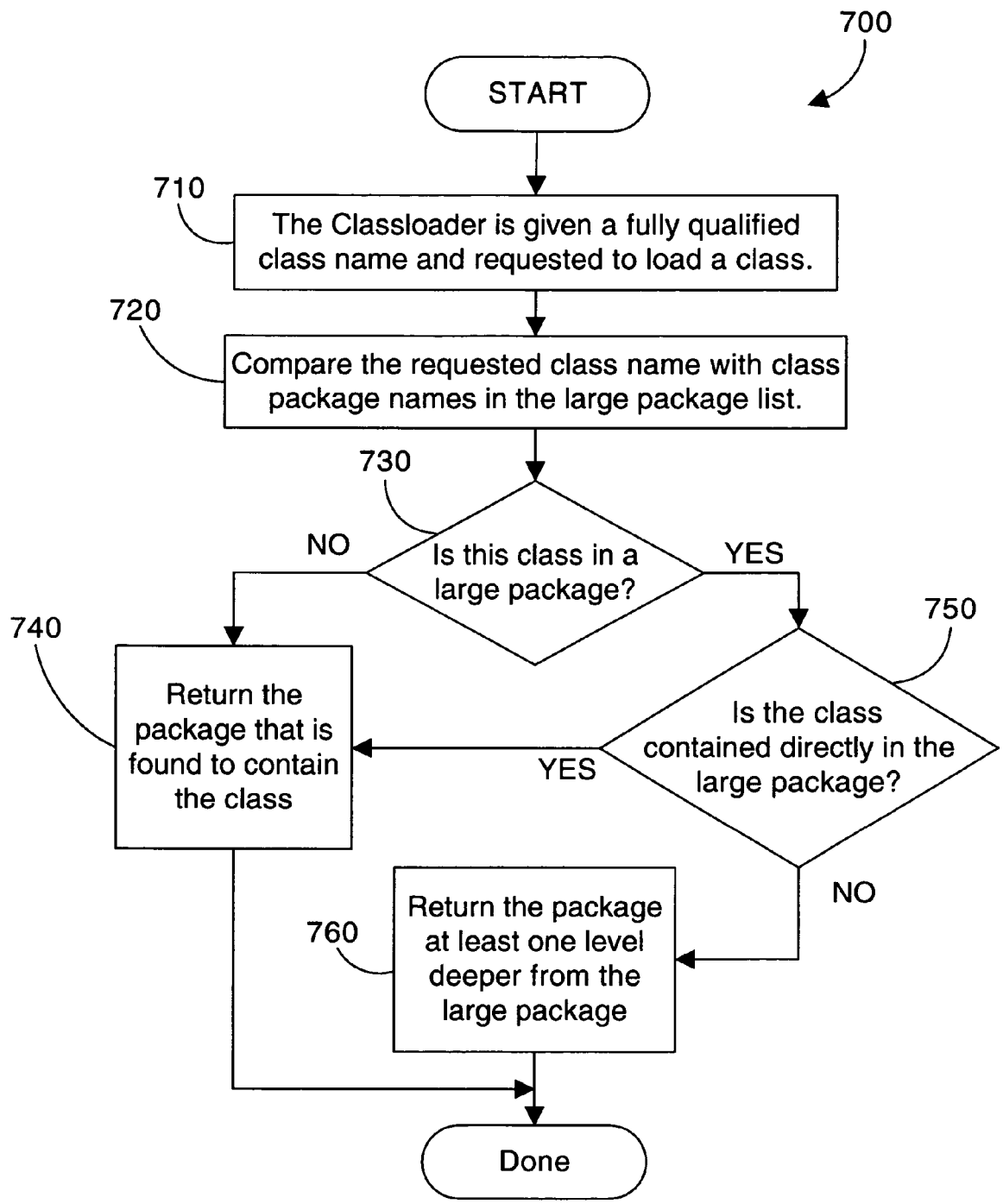
FIG. 7 shows a method flow diagram for optimizing access to the JAR mapping index using a large package list in accordance with preferred embodiments.

Referring now to FIG. 7, a method 700 is shown according to preferred embodiments herein. Method 700 illustrates using a large package list to optimize access to the mapping index as described above. The method returns a class package to use to access the mapping index to access a requested class. The class loader is given a fully qualified class name and requested to load the class (step 710). The requested class name is compared with the class package names in the large package list (step 720). If the requested class is not in a large package (step 730=no) then the package that is found to contain the class is returned (step 740). If the requested class is in one of the large packages (step 730=yes) and the class is contained directly in the large package (step 750=yes), then the package that is found to contain the class is returned to look up the class in the mapping index 127. If the requested class is in one of the large packages (step 730=yes) and the class is not contained directly in the large packages (step 750=no), then the package one level deeper from the large package is returned to look up the class in the mapping index 127. The method is then done.

Figure 8:
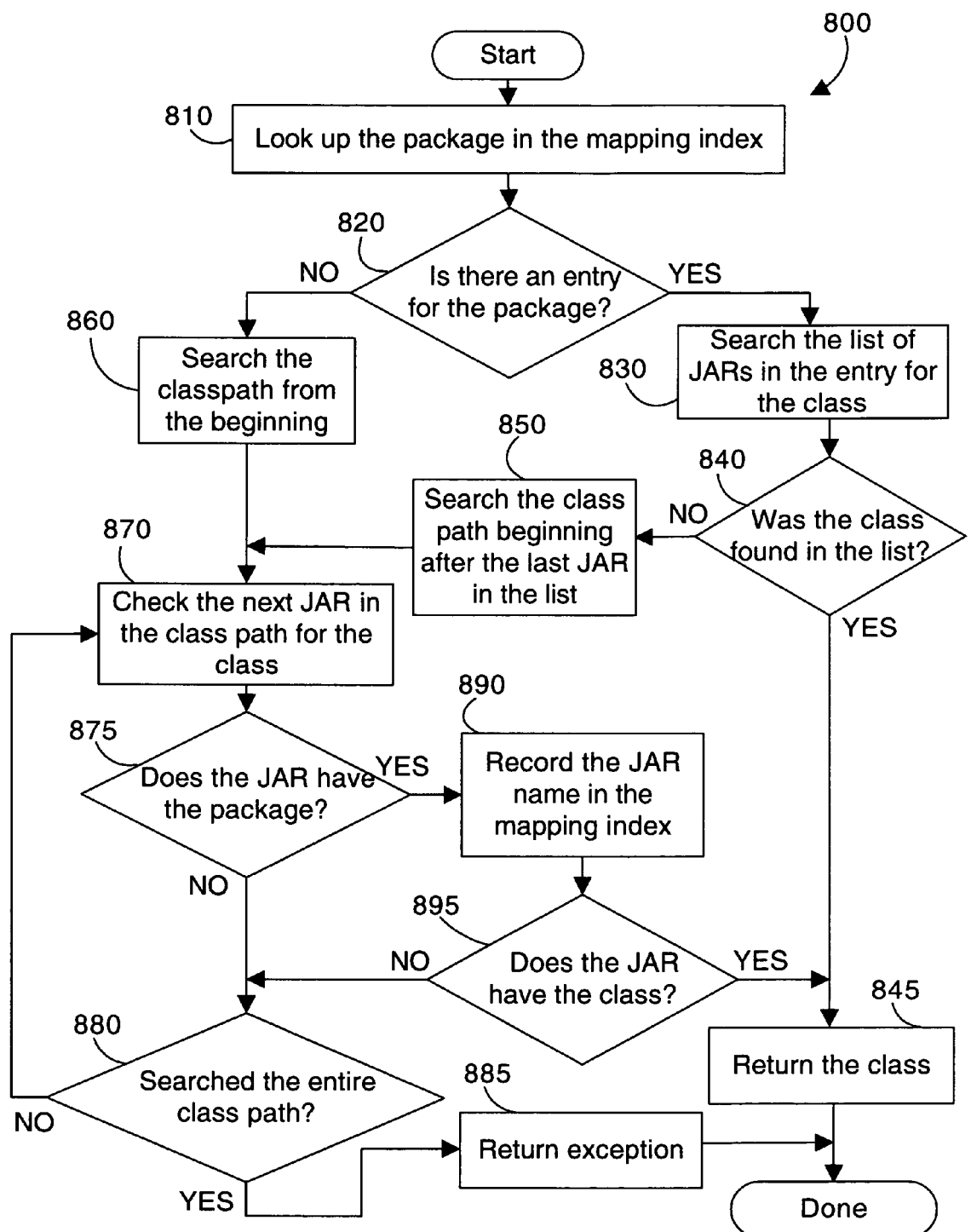
FIG. 8 shows a method flow diagram for creating a real-time package to JAR mapping index in accordance with preferred embodiments.

Referring now to FIG. 8, a method 800 is shown according to preferred embodiments herein. Method 800 illustrates creating a mapping index 127 according to preferred embodiments. The method receives a package to look up in the index (step 810). If there is already an entry in the index for the package (step 820=yes), then search the JARS in the JAR list for the requested class (step 830). If the class is found (step 840=yes), then return the class (step 845) and the method is done. If the class is not found (step 840=no), then search the class path beginning after the last JAR in the JAR list (step 850) to optimize the search for the class path. At this point, the method continues with step 870 described below to find the class and record the result in the mapping index.

Again referring to FIG. 8, if there is no entry for the package in the mapping index (step 820=no) then search the class path from the beginning (step 860). Check the next JAR in the class path for the requested class (step 870). If the JAR does not have the requested package (step 875=no) and if the entire class path has been not been searched (step 880=no) then return to step 870. If the entire class path has been searched (step 880=yes) then return an exception (step 885) and the method is done. If the JAR has the requested package (step 875=yes) then record the JAR name in the mapping index (step 890). If the JAR has the requested class (step 895=yes) then return the class (step 845) and the method is done. If the JAR does not have the requested class (step 895=no) then continue with step 880 to search the entire class path.

Figure 9:
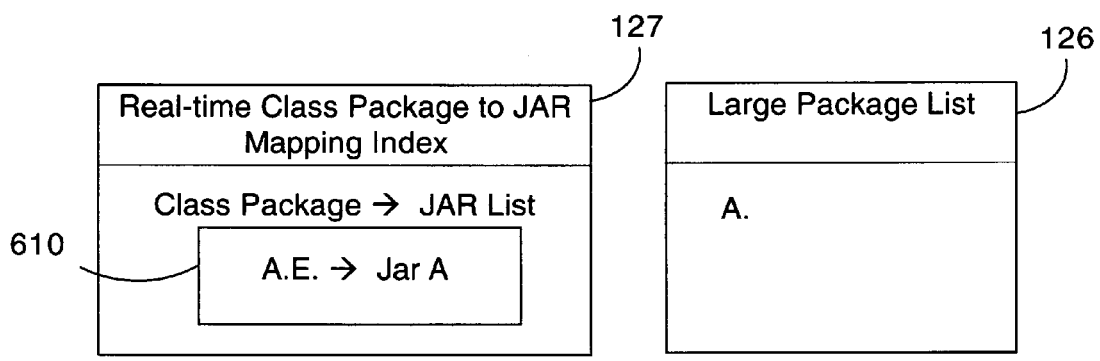
FIG. 9 is a block diagram showing a package to JAR index according to the preferred embodiments.

FIG. 9 shows an example of creating a mapping index 127 according to preferred embodiments. This example assumes mapping index 127 and the large package list 126 begin as shown in FIG. 6 and use the flow of method 700 and method 800 in FIGS. 7 and 8 respectively. To begin, this example further assumes the class loader is given the fully qualified class name of A.E.F.5 and requested to load the class (step 710). The requested class name is compared with the class package names in the large package list (step 720). Since the requested class (A.E.F.5) is in the large package (A) (step 730=yes) and the class is not contained directly in the large packages (step 750=no), then the package one level deeper than the large package (A.E) is returned to look up the class in the mapping index 127 (method 700 is then done and the example continues with method 800). The package A.E is used to look for an entry in the mapping index (step 810). Since there is not an entry for the package in the mapping index (step 820=no) the class path is searched from the beginning (step 860). The next JAR in the class path for the requested class is checked (JAR A) (step 870). Since JAR A has the requested package (step 875=yes), the JAR name JAR A is recorded in the mapping index (step 890) as shown in FIG. 9 for the package name A.E. Further, since JAR A has the requested class (A.E.F.5) (step 895=yes) the class is returned (step 845).

Figure 10:
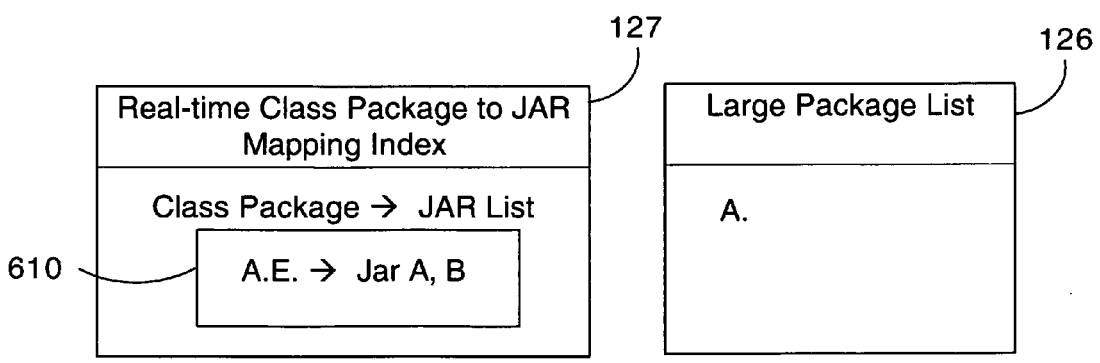
FIG. 10 is a block diagram showing a package to JAR index according to the preferred embodiments.

Another example of creating a mapping index 127 according to preferred embodiments will be described with reference to FIGS. 9 and 10. This example assumes mapping index 127 and the large package list begins as shown in FIG. 9 and described in the previous paragraph. To begin, this example assumes the class loader is given the fully qualified class name of A.E.F.15 and requested to load the class (step 710). The requested class name is compared with the class package names in the large package list (step 720). Since the requested class (A.E.F.5) is in the large package (A) (step 730=yes) and the class is not contained directly in the large packages (step 750=no), then the package one level deeper than the large package (A.E) is returned to look up the class in the mapping index 127 (method 700 is then done and the example continues with method 800). The package A.E is used to look for an entry in the mapping index (step 810). Since there is already an entry in the index for the package A.E (step 820=yes), then search the JARS in the JAR list for the requested class (step 830). Since the class A.E.F.15 is not found in JAR A (step 840=no), search the class path beginning after the last JAR in the JAR list (search beginning after JAR A or at JAR B) (step 850) to optimize the search for the class path. The next JAR in the class path (JAR B) is checked (step 870) and found to contain the package A.E.F (step 875=yes) so the name JAR B is included in the JAR list in the mapping index as shown in FIG. 10. And since the JAR B is found to contain the class (A.E.F.15) (step 895=yes) the class is returned (step 845).

A class package to JAR mapping mechanism and associated methods in accordance with the present invention provide a tool for creating and maintaining a real-time package to JAR (class file archive) mapping index. Embodiments herein provide a way to reduce system resources for searching a class path and the associated archive files for a class needed by an application in an object oriented programming environment.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. A method for creating a real-time class package to class archive file index, the method comprising the steps of:
   (A) receiving a request for a class from an application;
   (B) creating, using a computer processor, a record in an index in response to the request that correlates a class package with one or more class archive files;
   (C) creating a large package list that contains a plurality of known large packages;
   (D) searching the large package list for the class; and
   (E) where the class is in a large package and the class is not contained directly in the large package, returning the package at least one level deeper than the package found to contain the class to use to look up the class in the index.

2. The method of claim 1 wherein the application program is a Java application and the class archive file is a JAR.

3. The method of claim 1 further comprising the steps of:
   (F) looking up the class package in the index to find a list of one or more class archive files;
   (G) searching the list for the class; and
   (H) where the class is not found, searching the class path beginning after the last class archive file on the list.

4. The method of claim 1 wherein the large package list contains predetermined data.

5. The method of claim 4 wherein the predetermined data is generated by the mapping mechanism and stored for use in a subsequent invocation of the class loader.

* * * * *